United States Patent
Lee et al.

(10) Patent No.: US 8,804,226 B2
(45) Date of Patent: Aug. 12, 2014

(54) UNIT OF OPTICAL MODULATOR, OPTICAL MODULATOR INCLUDING THE SAME, AND METHOD OF FABRICATING THE OPTICAL MODULATOR

(75) Inventors: Sang-hun Lee, Seoul (KR); Chang-young Park, Yongin-si (KR); Jo-ho Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 13/531,964

(22) Filed: Jun. 25, 2012

(65) Prior Publication Data
US 2013/0077150 A1 Mar. 28, 2013

(30) Foreign Application Priority Data
Sep. 26, 2011 (KR) .................. 10-2011-0096984

(51) Int. Cl.
*G02F 1/03* (2006.01)
*B29D 11/00* (2006.01)

(52) U.S. Cl.
CPC . *G02F 1/03* (2013.01); *Y10S 359/90* (2013.01)
USPC ........... 359/247; 359/248; 359/250; 359/254; 359/900; 216/24

(58) Field of Classification Search
USPC ......... 359/247, 248, 250, 254, 900; 216/3, 24
See application file for complete search history.

(56) References Cited

U.S. PATENT DOCUMENTS 6,363,225 B1 3/2002 Sugawara
2013/0175500 A1* 7/2013 Cho et al. .................. 257/21

FOREIGN PATENT DOCUMENTS

| JP | 2006098990 A | 4/2006 |
|---|---|---|
| KR | 9533432 A | 12/1995 |
| KR | 1020040074297 A | 8/2004 |

* cited by examiner

*Primary Examiner* — Jack Dinh
(74) *Attorney, Agent, or Firm* — Sughrue Mion, PLLC

(57) ABSTRACT

An optical modulator unit, an optical modulator, and a method of fabricating are provided. The optical modulator unit includes a first contact layer transmitting infrared rays, a lower reflection layer disposed on the first contact layer, an active layer, including a multiple quantum well, disposed on the lower reflection layer, and an upper reflection layer disposed on the active layer. The optical modulator includes a plurality of optical modulator units sharing the first contact layer. The method includes sequentially stacking a first contact layer, a lower reflection layer, an active layer, an upper reflection layer, and a second contact layer on a substrate; etching the second contact layer, the upper reflection layer, the active layer, and the lower reflection layer, exposing a surface of the first contact layer; forming a first electrode on the first contact layer; and forming a second electrode on the second contact layer.

23 Claims, 14 Drawing Sheets

FIG. 1B

| | Material | Thickness(A) | Remark |
|---|---|---|---|
| 150 — GaAs | 100 | p-contact |
| 140c — $Al_{0.2}GaAs$ | 505 | Top DBR 1 pair |
| 140b — $Al_{0.87}GaAs$ | 685 | |
| 140a — $Al_{0.2}GaAs$ | 610 | Top DBR 5 pairs |
| 140b — $Al_{0.87}GaAs$ | 685 | |
| 145 — $Al_{0.31}GaAs$ | 51 | Cladding |
| 130a — GaAs | 80 | Active (MQW) 59 wells |
| 130b — $Al_{0.31}GaAs$ | 40 | |
| 130a — GaAs | 80 | |
| 145 — $Al_{0.31}GaAs$ | 51 | Cladding |
| 120b — $Al_{0.87}GaAs$ | 685 | Bottom DBR 6 pairs |
| 120a — $Al_{0.2}GaAs$ | 610 | |
| 110 — InGaP | n∗λ | n-contact |
| 190 — GaAs substrate | | |

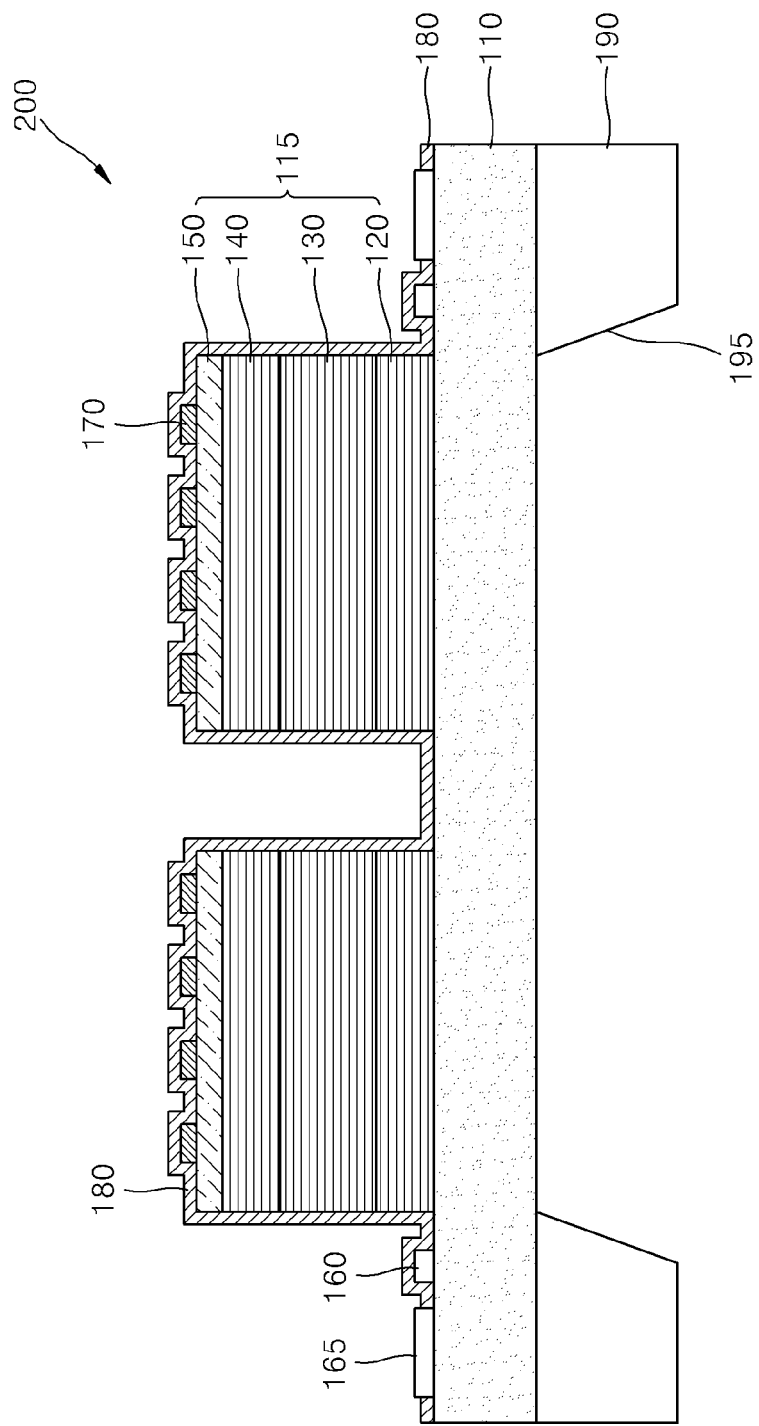

UNIT OF OPTICAL MODULATOR, OPTICAL MODULATOR INCLUDING THE SAME, AND METHOD OF FABRICATING THE OPTICAL MODULATOR

CROSS-REFERENCE TO RELATED APPLICATIONS

This application claims priority from Korean Patent Application No. 10-2011-0096984, filed on Sep. 26, 2011, in the Korean Intellectual Property Office, the disclosure of which is incorporated herein in its entirety by reference.

BACKGROUND

1. Field

Apparatuses and methods consistent with exemplary embodiments relate to an optical modulator unit, an optical modulator including the optical modulator unit, and a method of fabricating the optical modulator, and more particularly, to a transmissive-type optical modulator unit which transmits infrared rays, an optical modulator including the transmissive type optical modulator unit, and a method of fabricating the optical modulator.

2. Description of the Related Art

A method of measuring distances from a large number of points on a surface of a subject is used in a three dimensional (3D) image acquisition apparatus such as a 3D camera. Time-of-flight (TOF) methods have been introduced to obtain more accurate distance information about a subject. A phase delay measurement method that is one TOF method that uses external modulation (EM) that is favorable for obtaining a distance image with a high resolution. A gallium arsenide (GaAs) semiconductor-based optical modulator, which is easy to implement, has a small size, and may be driven with a low voltage, has been proposed to embody the EM. The GaAs semiconductor-based optical modulator is an optical modulator in which a multiple quantum well (MQW) is disposed between a P-type electrode and an N-type electrode, and uses a phenomenon whereby light is absorbed into the MQW when a reverse bias voltage is applied to both electrodes. The GaAs semiconductor-based optical modulator may be driven at high speed, has a comparatively low driving voltage, and has a large reflectivity difference between a turn-on state and a turn-off state, that is, a large contrast ratio. However, the GaAs semiconductor-based optical modulator has low transmittance with respect to infrared rays.

SUMMARY

One or more exemplary embodiments provide optical modulator units which are capable of transmitting infrared rays.

One or more exemplary embodiments provide optical modulators including an optical modulator unit which is capable of transmitting infrared rays.

One or more exemplary embodiments provide methods of fabricating an optical modulator including an optical modulator unit which is capable of transmitting infrared rays.

Additional aspects will be set forth in part in the description which follows and, in part, will be apparent from the description, or may be learned by practice of exemplary embodiments.

According to an aspect of an exemplary embodiment, an optical modulator unit includes: a first contact layer for transmitting infrared rays; a lower reflection layer which is disposed on the first contact layer; an active layer which is disposed on the lower reflection layer and includes a multiple quantum well (MQW); and an upper reflection layer which is disposed on the active layer.

The first contact layer may transmit near infrared rays (NIR) whose wavelength is in a range of 750 nm to 3000 nm.

If a center wavelength of incident rays to be modulated is $\lambda$, an optical thickness of the first contact layer may be an integer multiple of $\lambda$.

The first contact layer may include $InGa_xAl_{1-x}P$ (here, $0 \leq x \leq 1$).

The optical thickness of the first contact layer may be $8\lambda$ through $12\lambda$.

The lower reflection layer and the upper reflection layer each may include a structure in which a first refraction layer and a second refraction layer, each of which having an optical thickness of $\lambda/4$ and whose refractive indexes are different from each other, are repeatedly and alternately stacked.

The first refraction layer may include $Al_xGa_{1-x}As$ and the second refraction layer may include $Al_yGa_{1-y}As$ (here, $0 < x < 1$, $0 < y < 1$, $x < y$).

The optical modulator unit may further include a second contact layer which is disposed on the upper reflection layer.

According to an aspect of another exemplary embodiment, an optical modulator includes a plurality of optical modulator units that are the same as that described above, wherein the plurality of optical modulator units are arranged in a two dimensional array form and share the first contact layer.

The optical modulator may further include: a first electrode which is disposed on the first contact layer; and a second electrode which is disposed on the plurality of optical modulator units.

The second electrode may be formed in a lattice form.

The second electrode may be formed in the lattice form of a fish bone shape or a mesh shape.

The optical modulator may further include an insulation layer which is disposed on the first contact layer and the plurality of optical modulator units.

The optical modulator may further include a substrate which is disposed under the first contact layer and in which a penetration hole is formed.

The penetration hole may be formed under the plurality of optical modulator units.

According to an aspect of another exemplary embodiment, a method of fabricating an optical modulator includes: stacking a first contact layer, a lower reflection layer, an active layer, an upper reflection layer, and a second contact layer sequentially on a substrate; etching the second contact layer, the upper reflection layer, the active layer, and the lower reflection layer until a surface of the first contact layer is exposed; and forming a first electrode on the first contact layer, and forming a second electrode on the second contact layer.

The method may further include forming a penetration hole by etching the substrate from the lower portion thereof, by using the first contact layer as an etching stop layer.

If a center wavelength of incident rays to be modulated is $\lambda$, an optical thickness of the first contact layer may be an integer multiple of the $\lambda$.

The optical thickness of the first contact layer may be $8\lambda$ through $12\lambda$.

The first contact layer may include $InGa_xAl_{1-x}P$ (here, $0 \leq x \leq 1$).

The method may further include forming an insulation layer for covering the first contact layer, the lower reflection layer, the active layer, the upper reflection layer, and the second contact layer.

BRIEF DESCRIPTION OF THE DRAWINGS

These and/or other exemplary aspects will become apparent and more readily appreciated from the following description of exemplary embodiments, taken in conjunction with the accompanying drawings in which:

FIG. 1B illustrates an exemplary layer structure and layer thickness of the optical modulator unit of FIG. 1A

FIGS. 7A through 7E are cross-sectional views illustrating processes of fabricating the optical modulator, according to an exemplary embodiment.

DETAILED DESCRIPTION

Figure 1A:
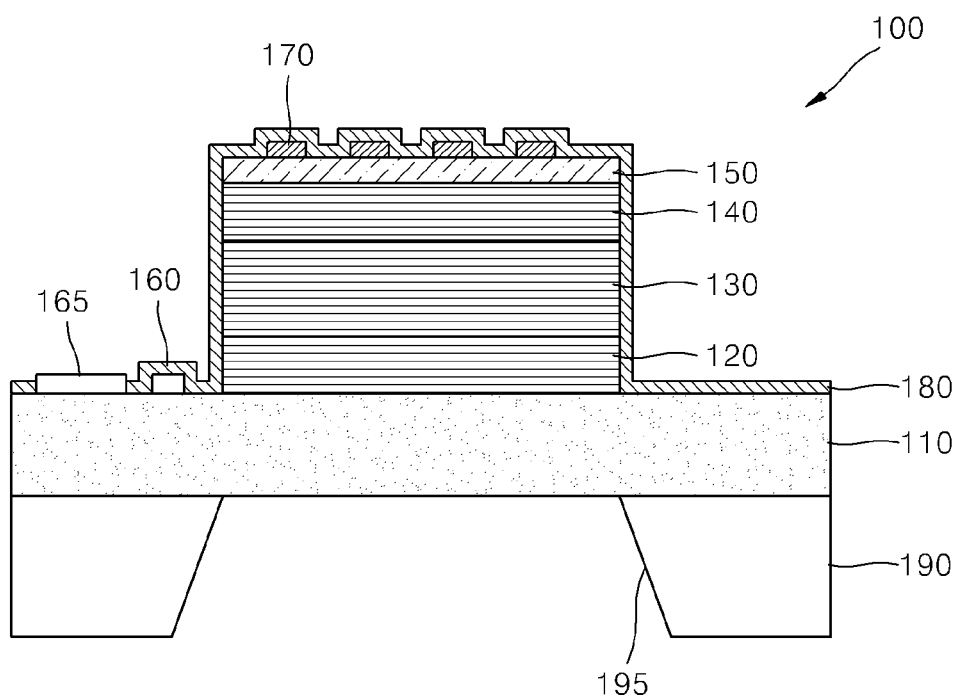
FIG. 1A is a cross-sectional view of an optical modulator unit according to an exemplary embodiment.

Various exemplary embodiments will now be described more fully with reference to the accompanying drawings in which some exemplary embodiments are shown.

Detailed illustrative exemplary embodiments are disclosed herein. However, specific structural and functional details disclosed herein are merely representative for purposes of describing exemplary embodiments. The inventive concept may, however, may be embodied in many alternate forms and should not be construed as limited to only the exemplary embodiments set forth herein.

Accordingly, while exemplary embodiments are capable of various modifications and alternative forms, embodiments thereof are shown by way of example in the drawings and will herein be described in detail. It should be understood, however, that there is no intent to limit the exemplary embodiments to the particular forms disclosed, but on the contrary, the exemplary embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

The terminology used herein is for the purpose of describing particular exemplary embodiments only and is not intended to be limiting of the exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. In the drawings, the thicknesses of layers and regions are exaggerated for clarity.

FIG. 1A is a cross-sectional view of an optical modulator unit 100 according to an exemplary embodiment, and FIG. 1B illustrates an exemplary layer structure and layer thickness of the optical modulator unit 100 of FIG. 1A.

Referring to FIG. 1A, the optical modulator unit 100 may include a first contact layer 110, a lower reflection layer 120 disposed on the first contact layer 110, an active layer 130 disposed on the lower reflection layer 120, an upper reflection layer 140 disposed on the active layer 130, and a second contact layer 150 disposed on the upper reflection layer 140. In addition, the optical modulator unit 100 may further include a substrate 190 disposed under the first contact layer 110. The first contact layer 110 may be an N-type contact layer doped with an N-type dopant, and the second contact layer 150 may be a P-type contact layer doped with a P-type dopant. In this case, the lower reflection layer 120 may be doped with the N-type dopant, and the upper reflection layer 140 may be doped with the P-type dopant.

The substrate 190, for example, may be composed of undoped Gallium Arsenide (GaAs) or the like. If the substrate 190 is composed of GaAs, which is opaque to infrared rays, a portion of the GaAs substrate may be removed to make the optical modulator unit 100 transparent to the infrared rays. Thus, a penetration hole 195 may be formed in the substrate 190. The penetration hole 195 may be formed in the substrate, using the first contact layer 110 as an etching stop layer. The penetration hole 195 may be formed in a lower part of the optical modulator unit 100 disposed on the substrate 190. A cross-section of the penetration hole 195 may be formed in a polygon shape such as a quadrangle or a round shape.

The first contact layer 110 may be disposed on the substrate 190. The first contact layer 110 may be connected to a first electrode 160 for applying a voltage to the active layer 130. The first contact layer 110 may transmit the infrared rays, for example, near infrared rays (NIR) whose wavelength is in the range of 750 nanometer (nm) to 3000 nm. For example, the optical modulator unit 100 may be designed to have a center absorption wavelength of about 850 nm. In addition, the first contact layer 110 may include InGaP, InAlP, $InGa_xAl_{1-x}P$ (here, $0<x<1$), or the like. The first contact layer 110 may be an N-type contact layer doped with an N-type dopant, and, for example, may be doped with Silicon (Si), Sulfur (S), Selenium (Se), Tellurium (Te), or the like. If a center wavelength of incident rays to be modulated is $\lambda$, the optical thickness of the first contact layer 110 may be an integer multiple of $\lambda$. For example, the optical thickness of the first contact layer 110 may be in the range of 1λ to 20λ. In detail, the optical thickness of the first contact layer 110 may be from 8λ to 12λ. In the case of the first contact layer 110, although the thickness thereof increases, transmittance with respect to the infrared rays does not rapidly decrease and may be maintained within a certain range. Thus, instead of the substrate 190 in which the penetration hole 195 is formed, the first contact layer 110 having the large thickness may support the optical modulator unit 100, and thus, the rigidity of the optical modulator unit 100 may be improved.

The lower reflection layer 120 and the upper reflection layer 140 may each have a structure in which a low refraction layer having a relatively low refractive index and a high refraction layer having a relatively high refractive index are repeatedly and alternately stacked. For example, the lower and upper reflection layers 120 and 140 may each include a plurality of $Al_xGa_{1-x}As/Al_yGa_{1-y}As$ structures each including $Al_xGa_{1-x}As$ as the high refraction layer and $Al_yGa_{1-y}As$ as the low refraction layer (0<x<1, 0<y<1, x<y). For example, the lower and upper reflection layers 120 and 140 may each include a structure in which a plurality of $Al_{0.31}Ga_{0.69}As/Al_{0.84}Ga_{0.16}As$ layers are repeatedly stacked or may each include a structure in which a plurality of $Al_{0.5}Ga_{0.5}As/AlAs$ layers are repeatedly stacked. Each of the lower and upper reflection layers 120 and 140 may be a distributed Bragg reflector (DBR).

If rays having a predetermined wavelength are incident on the lower and upper reflection layers 120 and 140 having the multilayer structure, reflection occurs at the boundary between the high refraction layer and the low refraction layer in each of the lower and upper reflection layers 120 and 140. At this time, a high reflection ratio may be obtained by equalizing phase differences between all reflected rays. For this, an optical thickness (that is, a value obtained by multiplying a physical thickness by a refractive index of a layer material) of each of the layers in the lower and upper reflection layers 120 and 140 may be formed to a thickness which is an odd number multiple of λ/4 (here, λ is a wavelength of incident rays to be modulated). The reflection ratios of the lower and upper reflection layers 120 and 140 may become higher as the number of pairs of the high and low refraction layers increases. Each of the lower and higher reflection layers 120 and 140 may also function as a path through which a current flows, so that the current may be transmitted to the active layer 130. For this, for example, the lower reflection layer 120 may be an N-type DBR layer doped with Silicon (Si), and the upper reflection layer 140 may be a P-type DBR layer doped with Beryllium (Be).

The active layer 130 is a layer in which rays are absorbed, and may include a multi-quantum well (MQW) layer structure in which a plurality of quantum well layers and a plurality of barrier layers are repeatedly stacked. For example, the active layer 130 may include a barrier layer which is formed of $Al_{0.31}Ga_{0.69}As$ and a quantum well layer which is formed of GaAs. The active layer 130 functions also as a cavity for Fabry-Perot resonance. For this, the active layer 130 may be formed so that an optical thickness thereof is equal to an integer multiple of λ/2. Then, rays having a wavelength λ may be sufficiently absorbed in the active layer 130 while resonating between the lower reflection layer 120 and the upper reflection layer 140. For example, the optical thickness of the active layer 130 may be 2.0λ. In general, absorptivity may increase and a driving voltage may become higher if the thickness of the active layer 130 is relatively large, and the absorptivity may decrease and the driving voltage may become lower if the thickness of the active layer 130 is relatively small.

A cavity layer (not shown) may be further disposed in the upper reflection layer 140. The cavity layer functions as an additional microcavity for the Fabry-Perot resonance. For this, the cavity layer may be formed so that an optical thickness thereof is equal to an integer multiple of λ/2. For example, the optical thickness of the cavity layer may be λ/2. This cavity layer may be formed of a single material. For example, the material of the cavity layer may be the same as that of the high refraction layer (for example, $Al_{0.31}Ga_{0.69}As$ or $Al_{0.5}Ga_{0.5}As$, which is referred to as a high refraction layer material hereinafter) of the upper reflection layer 140 or may be the same as that of the low refraction layer (for example, $Al_{0.84}Ga_{0.16}As$ or AlAs, which is referred to as a low refraction layer material hereinafter) of the upper reflection layer 140. In addition, the cavity layer as well as the upper reflection layer 140 may also be doped with a P-type dopant to transmit a current to the active layer 130.

The upper reflection layer 140 may be divided into two portions due to the cavity layer. That is, a first upper reflection layer (not shown) may be disposed under the cavity layer, and a second upper reflection layer (not shown) may be disposed on the cavity layer. In a whole structure including the first upper reflection layer, the cavity layer, and the second upper reflection layer, an order in which the high refraction layer and the low refraction layer are repeated may be maintained as stated. For example, if the cavity layer is formed of the high refraction layer material, a layer directly adjacent to the lower part of the cavity layer may be a low refraction layer of the first upper reflection layer, and a layer directly adjacent to the upper part of the cavity layer may be a low refraction layer of the second upper reflection layer. On the contrary, if the cavity layer is formed of the low refraction layer material, a layer directly adjacent to the lower part of the cavity layer may be a high refraction layer of the first upper reflection layer, and a layer directly adjacent to the upper part of the cavity layer may be a high refraction layer of the second upper reflection layer. That is, it may be seen that the cavity layer is formed so that any one of a plurality of high refraction layers and low refraction layers in the upper reflection layer 140 has an optical thickness which is λ/2 rather than λ/4.

The second contact layer 150 may be disposed on the upper reflection layer 140. The second contact layer 150 may be connected to a second electrode 170 for applying a voltage to the active layer 130. The second contact layer 150 may be formed of GaAs or the like. The GaAs is favorable for formation of an ohmic contact when forming an electrode because an oxidation rate of the surface thereof is low and a bandgap thereof is small. A thickness of the second contact layer 150 may be about 100 Å in consideration of an absorption loss of the incident rays. In addition, the second contact layer 150 may be formed of InGaP, InAlP, $InGa_xAl_{1-x}P$ (0<x<1), or the like. The second contact layer 150 may be a P-type contact layer doped with a P-type dopant, for example, Beryllium (Be), Zinc (Zn), Manganese (Mn), or the like.

Referring to FIG. 1B, the second contact layer 150 functioning as the P-type contact layer is formed of P-GaAs. For example, the second contact layer 150 may be formed by doping GaAs with Be which is the P-type dopant. In this case, a doping concentration may be in the range of about $5.0 \times 10^{18}/cm^3$ to about $15.0 \times 10^{18}/cm^3$, for example, about $10.0 \times 10^{18}/cm^3$. As stated above, GaAs is favorable for formation of an ohmic contact when forming an electrode because an oxidation rate of the surface thereof is low and a bandgap thereof is small. A thickness of the second contact layer 150 may be about 100 Å in consideration of an absorption loss of the incident rays.

The upper reflection layer 140 located under the second contact layer 150 has a structure in which a high refraction layer 140a and a low refraction layer 140b are repeatedly and sequentially stacked. The high refraction layer 140a, for example, may be formed of $Al_{0.2}GaAs$ having a refractive index of about 3.483, and, in this case, a thickness of the high refraction layer 140a may be about 610 Å. Then, an optical thickness of the high refraction layer 140a may be $\lambda/4$ (=850 nm/4=physical thickness (610 Å)×refractive index (3.483)). In addition, the low refraction layer 140b, for example, may be formed of $Al_{0.87}GaAs$ having a refractive index of about 3.102, and, in this case, a thickness of the low refraction layer 140b may be about 685 Å. Then, an optical thickness of the low refraction layer 140b may be $\lambda/4$ (=850 nm/4=physical thickness (685 Å)×refractive index (3.102)). In the example of FIG. 1B, the upper reflection layer 140 has 6 pairs of the high refraction layer 140a and the low refraction layer 140b, which are repeatedly stacked. The high refraction layer disposed directly under the second contact layer 150, from among the 6 high refraction layers, may be replaced with a high refraction layer 140c having a thickness which is different from that of the high refraction layer 140a. For example, the thickness of the high refraction layer 140c may be about 505 Å.

As stated above, the upper reflection layer 140 functions also as a path through which a current flows. Thus, the upper reflection layer 140 may be doped with Be which is the P-type dopant. In this case, a doping concentration may be in the range of about $1.0 \times 10^{18}/cm^3$ to about $1.2 \times 10^{19}/cm^3$, for example, about $3.0 \times 10^{18}/cm^3$.

The active layer 130 which absorbs rays and functions as a main resonance cavity is disposed under the upper reflection layer 140. For example, the active layer 130 may include a plurality of quantum well layers 130a, which are formed of GaAs, and a plurality of barrier layers 130b which are disposed between the quantum well layers and formed of $Al_{0.31}GaAs$. For example, the active layer 130 may have a MQW layer structure including 59 quantum well layers 130a. A total thickness of the active layer 130 is designed so as to satisfy an optical thickness of $2\lambda$. For example, if the active layer 10 includes 59 quantum well layers 130a, a thickness of each of the quantum well layers 130a may be about 80 Å, and a thickness of each of the barrier layers 130b may be about 40 Å.

Since a refractive index of GaAs, which is the material forming the quantum well layers 130a, is large at about 3.652, incident rays may be reflected between the low refraction layer 140b of the upper reflection layer 140 and the quantum well layer 130a, and thus, a loss of the incident rays may occur. Thus, a cladding layer 145 having a medium refractive index may be further disposed between the low refraction layer 140b of the upper reflection layer 140 and the quantum well layer 130a of the active layer 130 to minimize the loss of the incident rays and control a thickness tolerance of the active layer 130. For example, the cladding layer 145 may be formed of $Al_{0.31}GaAs$ having a refractive index of about 3.413. For the same reason, the cladding layer 145 may be further disposed between the lower reflection layer 120 and the active layer 130. A thickness of the cladding layer 145 may be about 51 Å.

The lower reflection layer 120 is disposed under the active layer 130. The lower reflection layer 120 has a structure in which a low refraction layer 120b and a high refraction layer 120a are repeatedly and sequentially stacked. For example, the low refraction layer 120b may be formed of $Al_{0.87}GaAs$, and, in this case, a thickness of the low refraction layer 120b may be about 685 Å(that is, an optical thickness of $\lambda/4$). For example, the high refraction layer 120a may be formed of $Al_{0.2}GaAs$, and, in this case, a thickness of the high refraction layer 120a may be about 610 Å. In the example of FIG. 1B, the lower reflection layer 120 has 6 pairs of the low refraction layer 120b and the high refraction layer 120a which are repeatedly stacked. The lower reflection layer 120 also functions as a path through which a current flows. Thus, the lower reflection layer 120, for example, may be doped with Si which is the N-type dopant. In this case, a doping concentration may be in the range of about $2.0 \times 10^{18}/cm^3$ to about $2.6 \times 10^{18}/cm^3$.

In addition, the first contact layer 110 having an optical thickness of $n*\lambda$, that is, an integer multiple of a center wavelength $\lambda$ of the incident rays to be modulated, is disposed under the lower reflection layer 120. For example, the first contact layer 110 may be formed by doping InGaP with Si. In this case, a doping concentration may be in the range of about $5.0 \times 10^{18}/cm^3$ to about $15.0 \times 10^{18}/cm^3$, for example, about $8.0 \times 10^{18}/cm^3$. In addition, the first contact layer 110 may be formed of $InGa_xAl_{1-x}P(0 \leq x \leq 1)$.

The GaAs substrate 190 may be disposed under the first contact layer 110, and the penetration hole 195 may be formed in the GaAs substrate 190. Thus, a portion of the GaAs substrate 190 may be removed under a center portion of the first contact layer 110, and thus, a portion of the lower side of the first contact layer 110 may directly contact with air whose refractive index is 1.0.

Figure 2:
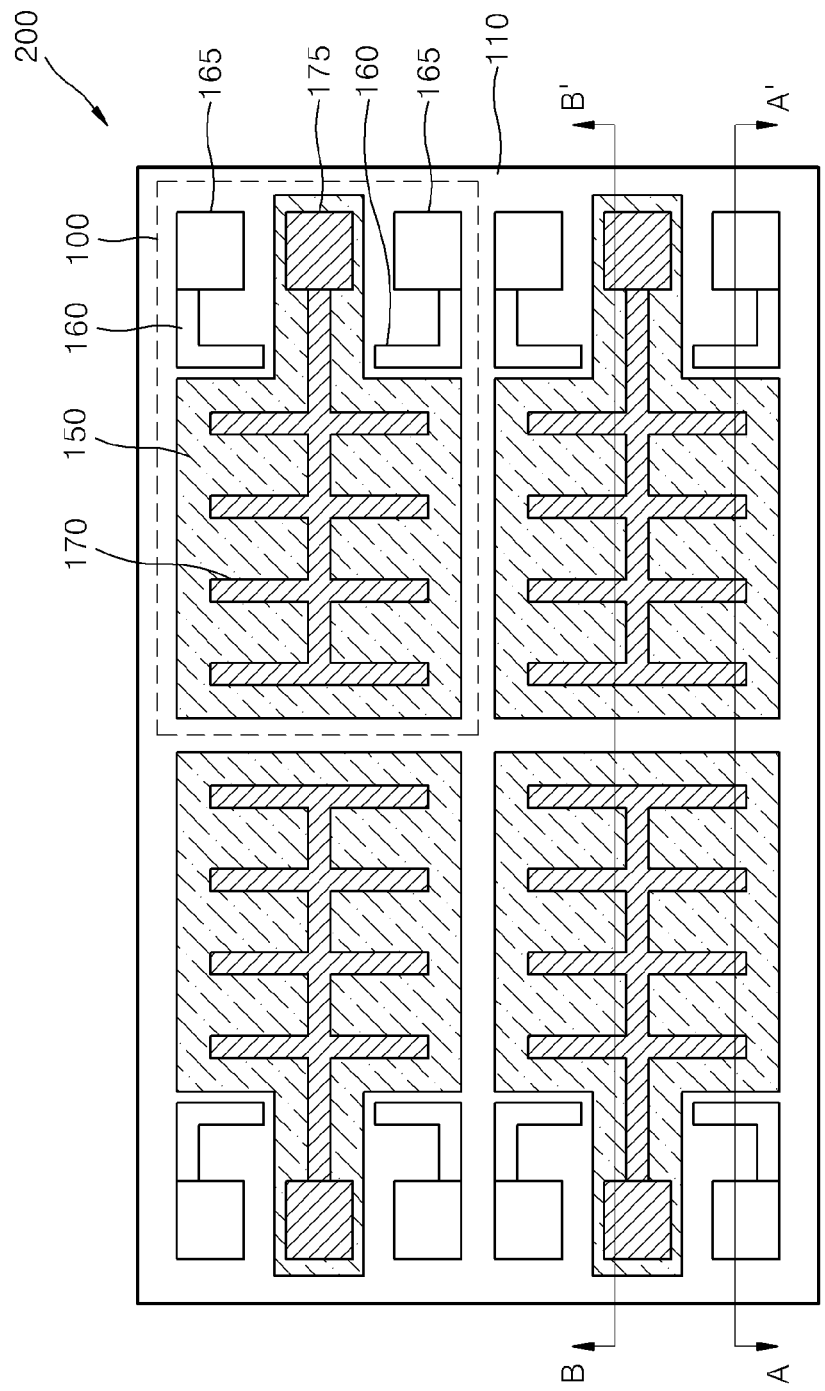
FIG. 2 is a plan view of an optical modulator according to an exemplary embodiment.

FIG. 2 is a plan view of an optical modulator 200 according to an exemplary embodiment.

Referring to FIG. 2, the optical modulator 200 may include a plurality of optical modulator units that are the same as the optical modulator unit 100 of FIG. 1A, and the plurality of optical modulator units may be arranged in a two dimensional array form. That is, the optical modulator 200 may include the optical modulator unit 100 of FIG. 1A as a unit cell. In FIG. 2, for example, the plurality of optical modulator units 100 are arranged in a 2×2 array. However, the array of the optical modulator units 100 is not limited thereto, and it is possible to select an arbitrary m×n array (here, m and n are natural numbers greater than 1) as the array of the optical modulator units 100, depending on design. In addition, the unit cell, namely the optical modulator unit 100, for example, may be a rectangular form having a size in the range of 2 mm×0.5 mm to 4 mm×1 mm.

The plurality of optical modulator units 100 may share the substrate 190 and the first contact layer 110. That is, a plurality of stacked structures, which sequentially include the lower reflection layer 120, the active layer 130, the upper reflection layer 140, and the second contact layer 150, may be disposed on the single substrate 190 and the single first contact layer 110. Each of the plurality of optical modulator units 100 may be electrically isolated from other adjacent optical modulator units 100 by an insulation layer (not shown).

A plurality of first electrode pads 165 may be disposed on the first contact layer 110, and each of the plurality of first electrode pads 165 may be electrically connected to the first electrode 160. The first electrode 160 also may be disposed on the first contact layer 110, and may be formed so as to surround the optical modulator unit 100 which is the unit cell. The first electrode 160 may be formed of a single metal material. However, for example, the first electrode 160 may be formed in a multilayer structure in which Pt, Ti, Pt, and Au layers are sequentially stacked. In addition, the first electrode 160 may be formed of a material such as Indium Tin Oxide (ITO), Zinc Oxide (ZnO), Aluminum Zinc Oxide (AZO), or the like which has light transmitting property.

A second electrode pad 175 may be disposed on the second contact layer 150, and the second electrode pad 175 may be electrically connected to the second electrode 170. The second electrode 170 also may be disposed on the second contact layer 150, and may be formed in a lattice form to reduce resistance thereof. For example, in FIG. 2, the second electrode 170 having a lattice form of a fish bone shape is exemplarily illustrated. However, the second electrode 170 may be formed in a lattice form of a matrix or mesh as well as the fish bone shape. In this case, since a total area of the second electrode 170 is reduced, surface resistance may decrease. If the second electrode 170 may be formed of a metal material, rays which are incident on the optical modulator unit 100 may be partially blocked. Thus, a width of the lattice may be small, in the range of 10 μm to 20 μm, to minimize optical loss. The second electrode 170 may be formed of a single metal material. However, for example, the second electrode 170 may be formed in a multilayer structure in which Platinum (Pt), Titanium (Ti), Pt, and Aurum (Au) layers are sequentially stacked. In addition, the second electrode 170 may be formed of a material such as Indium Tin Oxide (ITO), Zinc Oxide (ZnO), Aluminum Zinc Oxide (AZO), or the like which has light transmitting property.

In the case of the above-stated optical modulator 200, total capacitance may decrease because the optical modulator unit 100 is divided into a plurality of cells. In addition, a generation of parasitic capacitance may be suppressed because the first electrode 160 and the second electrode 170 are not disposed directly opposite to each other. For example, the first electrode 160 is disposed around the optical modulator unit 100 which is the unit cell, whereas the second electrode 170 is disposed in the center portion of the optical modulator unit 100 of the unit cell. In addition, since it is possible to form the first electrode 160 and the second electrode 170 to have a small size, it is possible to reduce surface resistance due to the electrodes and also reduce parasitic capacitance.

Figure 3:
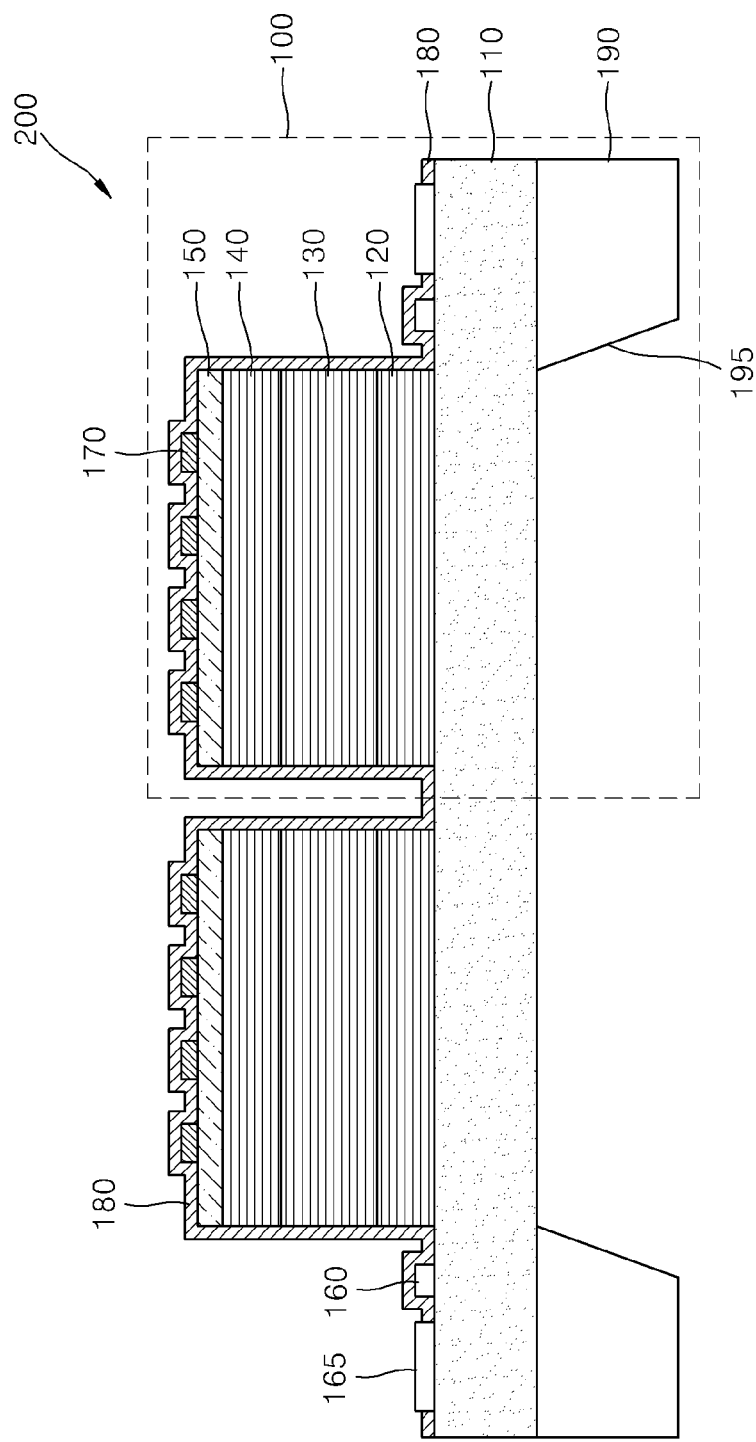
FIG. 3 is a cross-sectional view taken along a line A-A' in the optical modulator of FIG. 2.

FIG. 3 is a cross-sectional view taken along a line A-A' in the optical modulator 200 of FIG. 2.

Referring to FIG. 3, the optical modulator 200 may include a plurality of the optical modulator units 100, each of which is the unit cell. For example, two optical modulator units 100 are disposed symmetrically to each other on the substrate 190, but this is exemplarily and more optical modulator units 100 may be disposed on the substrate 190. Each of the optical modulator units 100 may include the first contact layer 110 disposed on the substrate 190, the lower reflection layer 120 disposed on the first contact layer 110, the active layer 130 disposed on the lower reflection layer 120, the upper reflection layer 140 disposed on the active layer 130, and the second contact layer 150 disposed on the upper reflection layer 140. In addition, a cavity layer (not shown) may be further disposed in the upper reflection layer 140. The first contact layer 110, for example, may be an N-type contact layer doped with an N-type dopant, and the second contact layer 150 may be a P-type contact layer doped with a P-type dopant. In this case, the lower reflection layer 120 may be doped with an N-type dopant, and the upper reflection layer 140 may be doped with a P-type dopant.

The plurality of optical modulator units 100 may share the substrate 190 and the first contact layer 110. That is, a plurality of stacked structures, which sequentially include the lower reflection layer 120, the active layer 130, the upper reflection layer 140, and the second contact layer 150, may be disposed on the single substrate 190 and the single first contact layer 110.

The substrate 190, for example, may be composed of undoped GaAs or the like. If the substrate 190 is composed of GaAs which is opaque to infrared rays, it is necessary to remove a portion of the GaAs substrate to make the optical modulator units 100 transparent to the infrared rays. Thus, a penetration hole 195 may be formed in the substrate 190. The penetration hole 195 may be formed in the substrate, using the first contact layer 110 as an etching stop layer. The penetration hole 195 may be formed in a lower part of each of the optical modulator units 100 disposed on the substrate 190.

The first contact layer 110 may be disposed on the substrate 190. The first contact layer 110 may be connected to the first electrode 160 for applying a voltage to the active layer 130. The first electrode 160 may be disposed on the first contact layer 110, and may be disposed around a plurality of structures, each of which includes the lower reflection layer 120, the active layer 130, the upper reflection layer 140, and the second contact layer 150. In addition, a voltage is applied to the first electrode 160, and the first electrode 160 may be electrically connected to the first electrode pad 165 disposed on the first contact layer 110.

The first contact layer 110 may transmit the infrared rays, and, in detail, may transmit near infrared rays (NIR) whose wavelength is in the range of 750 nm to 3000 nm. In addition, the first contact layer 110 may include InGaP, InAlP, $InGa_xAl_{1-x}P$ (here, $0<x<1$), or the like. The first contact layer 110 may be an N-type contact layer doped with an N-type dopant, and, for example, may be doped with Si, S, Se, Te, or the like. If a center wavelength of incident rays to be modulated is λ, the optical thickness of the first contact layer 110 may be an integer multiple of the λ. For example, the optical thickness of the first contact layer 110 may be in the range of 8λ to 12λ. In the case of the first contact layer 110, although the thickness thereof increases, transmittance with respect to the infrared rays does not rapidly decrease and may be maintained within a certain range. Thus, instead of the substrate 190 in which the penetration hole 195 is formed, the first contact layer 110 having the large thickness may support the optical modulator unit 100, and thus, the rigidity of the optical modulator unit 100 may be improved.

The second electrode 170 may be further disposed on the second contact layer 150. In addition, an insulation layer 180 may be further disposed on the plurality of optical modulator units 100. That is, the insulation layer 180 may be disposed to cover the first contact layer 110, the lower reflection layer 120, the active layer 130, the upper reflection layer 140, and the second contact layer 150, and thus, may electrically isolate the plurality of optical modulator units 100. In addition, the insulation layer 180 may be disposed on the first electrode 160, but the first electrode pad 165 may be exposed. The insulation layer 180 may be formed of a dielectric and, for example, may be formed of a material such as benzocyclobutene (BCB). The insulation layer 180 may be formed so as to fill a space between adjacent two optical modulator units 100.

Figure 4:
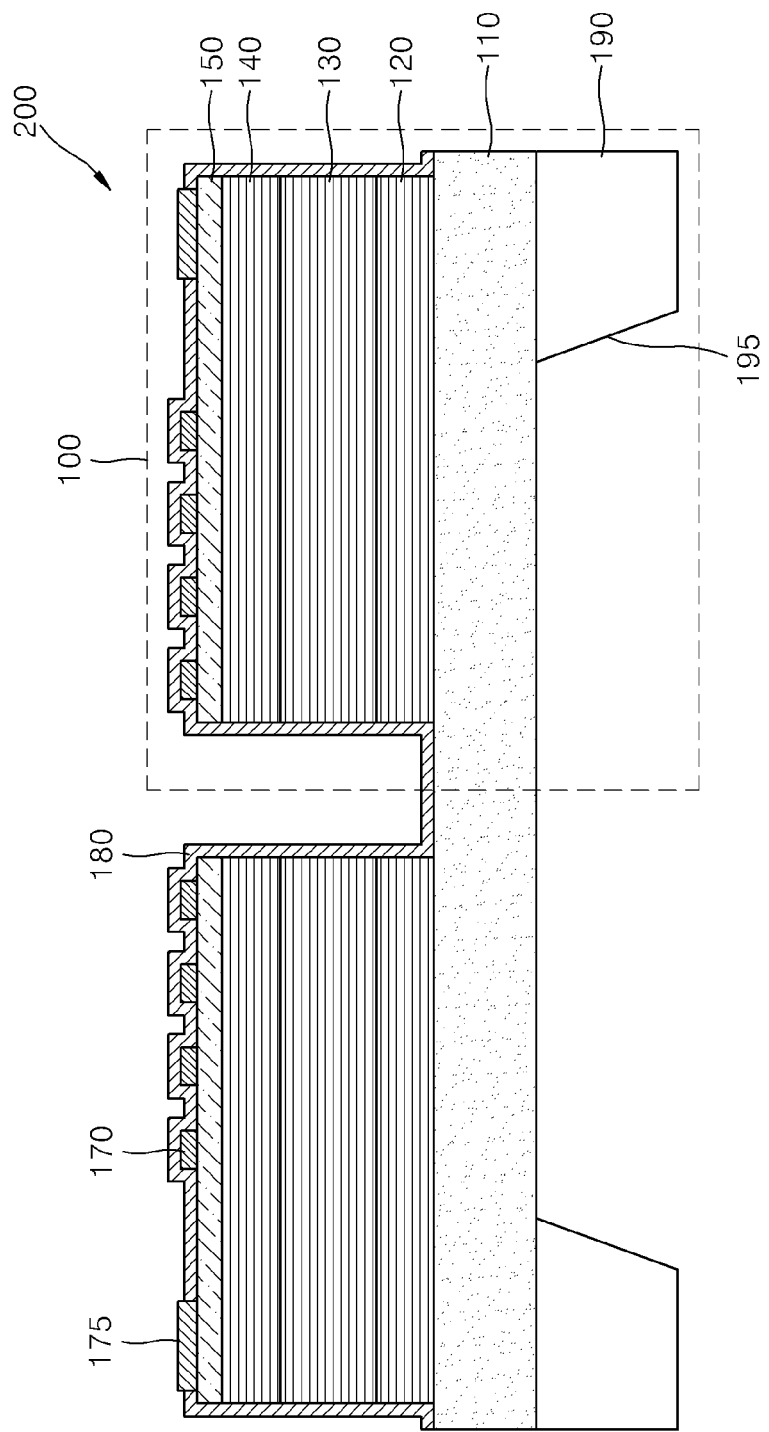
FIG. 4 is a cross-sectional view taken along a line B-B' in the optical modulator of FIG. 2.

FIG. 4 is a cross-sectional view taken along a line B-B' in the optical modulator 200 of FIG. 2.

Referring to FIG. 4, the optical modulator 200 may include a plurality of the optical modulator units 100, each of which is the unit cell. For example, two optical modulator units 100 are disposed symmetrically to each other on the substrate 190, but this is exemplarily and more optical modulator units 100 may be disposed on the substrate 190. Each of the optical modulator units 100 may include the first contact layer 110 disposed on the substrate 190, the lower reflection layer 120 disposed on the first contact layer 110, the active layer 130 disposed on the lower reflection layer 120, the upper reflection layer 140 disposed on the active layer 130, and the second contact layer 150 disposed on the upper reflection layer 140. In addition, the second electrode pad 175 and the second electrode 170, which are electrically connected to each other, may be disposed on the second contact layer 150.

In order to secure an area in which the second electrode pad 175 is disposed on the second contact layer 150, as illustrated in FIG. 2, the cross section of the optical modulator unit 100 may be formed so that a portion of a side of a rectangular shape is protruded. In addition, although illustrated as if the second electrode 170 is a plurality, as illustrated in FIG. 2, the second electrode 170 is a single electrode and may be formed to have a lattice form. For example, the second electrode 170 may be formed to have a lattice form such as a fish bone shape, a matrix, or a mesh. Generally, since, in the upper second contact layer 150, hole mobility is much lower than electron mobility, surface resistance of the upper second contact layer 150 may be ten times higher compared to that of the lower first electrode 160. Thus, it is possible to reduce the surface resistance by arranging the second electrode 170 in the lattice form on the second contact layer 150.

Although the surface resistance is reduced if the number of lattices increases in the second electrode 170, optical loss may increase and capacitance may increase, by as much as the number the lattices increased by. Thus, the number of the lattices may be determined in consideration of the extent that the surface resistance decreases and the extent that the optical loss and the capacitance increase. The insulation layer 180 may be further disposed on the plurality of optical modulator units 100, and the insulation layer 180 may be formed so as to fill a space between adjacent two optical modulator units 100. In addition, the insulation layer 180 may be disposed on the second electrode 170, but the second electrode pad 175 may be exposed.

Figure 5A:
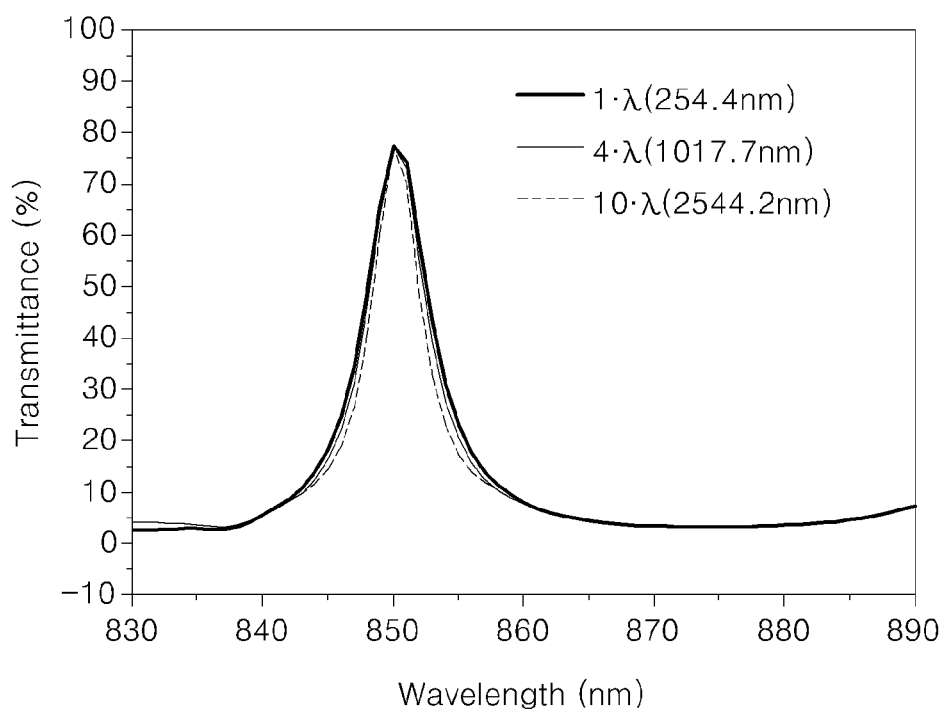
FIG. 5A illustrates a change in transmittance of incident rays depending on a thickness of a first contact layer, in a case where a voltage is not applied to the optical modulator.

FIG. 5A illustrates a change in transmittance of incident rays, of which a center wavelength $\lambda$ is 850 nm, depending on a thickness of the first contact layer 110, in a case where a voltage is not applied to the optical modulator 200. In detail, FIG. 5A illustrates a change in transmittance of the optical modulator 200 when an optical thickness of the first contact layer 110 is 1$\lambda$ (about 254.4 nm), 4$\lambda$ (about 1017.7 nm), or 10$\lambda$ (about 2544.2 nm), in a case where the optical modulator 200 includes the optical modulator unit 100 illustrated in FIG. 1B and the first contact layer 110 is formed of InGaP doped with Si.

Referring to FIG. 5A, in the case where a voltage is not applied to the optical modulator 200, the transmittance with respect to the near infrared rays (NIR) ($\lambda$=850 nm) of the optical modulator 200 is maintained to the extent of about 75% although the thickness of the first contact layer 110 increases. Also in a case where the thickness of the first contact layer 110 is 2$\lambda$, 3$\lambda$, 5$\lambda$, 6$\lambda$, 7$\lambda$, 8$\lambda$, or 9$\lambda$ (not shown), the transmittance with respect to the NIR ($\lambda$=850 nm) of the optical modulator 200 is maintained to the extent of about 75% although the thickness of the first contact layer 110 increases.

Figure 5B:
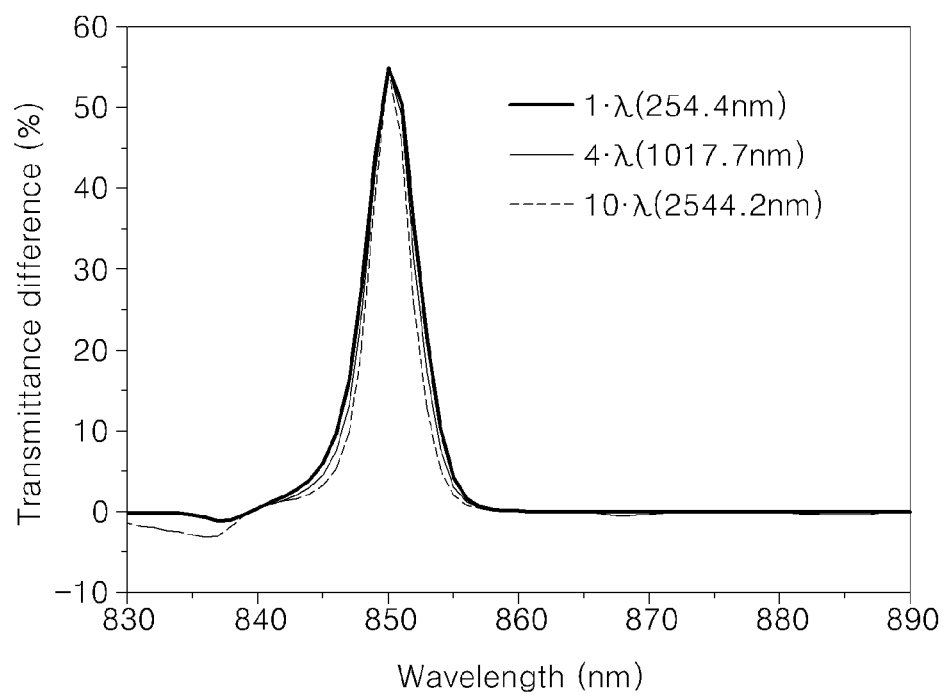
FIG. 5B illustrates a change in transmittance of incident rays depending on the thickness of the first contact layer, in a case where a voltage is applied to the optical modulator.

FIG. 5B illustrates a change in transmittance of incident rays, of which a center wavelength $\lambda$ is 850 nm, depending on the thickness of the first contact layer 110, in a case where a voltage is applied to the optical modulator 200. Similar to FIG. 5A, FIG. 5B illustrates a change in transmittance of the optical modulator 200 when an optical thickness of the first contact layer 110 is 1$\lambda$, 4$\lambda$, or 10$\lambda$, in a case where the first contact layer 110 is formed of InGaP.

Referring to FIG. 5B, in the case where a voltage is applied to the optical modulator 200, the transmittance with respect to the NIR ($\lambda$=850 nm) of the optical modulator 200 is maintained to the extent of about 56% although the thickness of the first contact layer 110 increases. Thus, although the optical modulator (200) includes the first contact layer 110 whose optical thickness is relatively large, for example, in the range of 8$\lambda$ to 12$\lambda$, the first contact layer 110 having the large thickness may support the optical modulator unit 200 on behalf of the substrate 190 without reducing the transmittance.

Figure 6A:
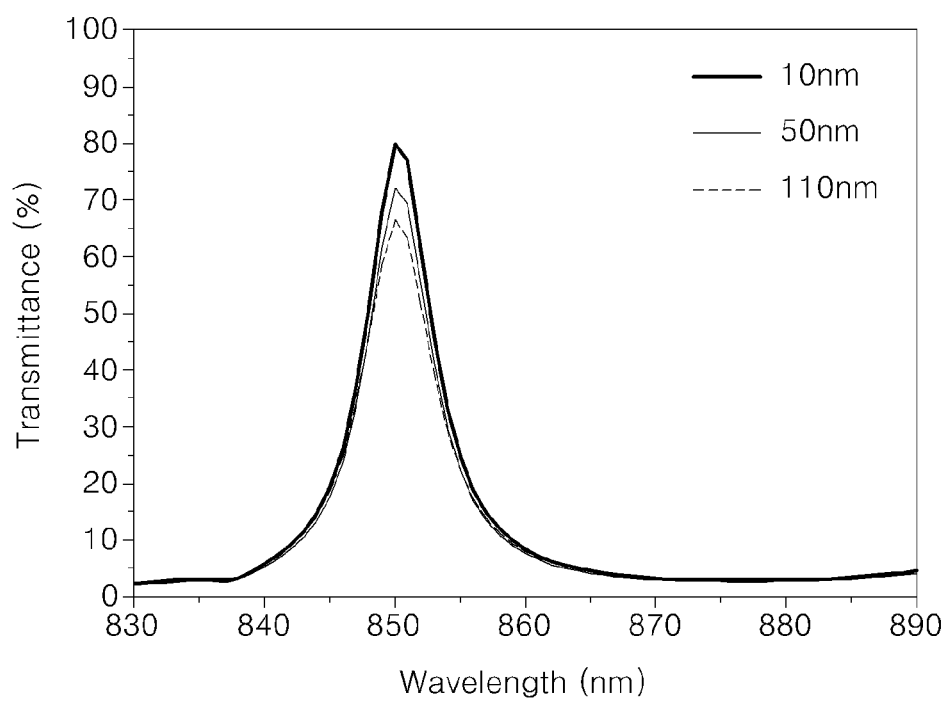
FIG. 6A illustrates a change in transmittance of incident rays depending on a thickness of an N-type contact layer, in a case where a voltage is not applied to an optical modulator according to a comparative example.

FIG. 6A illustrates a change in transmittance of incident rays, of which a center wavelength $\lambda$ is 850 nm, depending on a thickness of an N-type contact layer, in a case where a voltage is not applied to an optical modulator according to a comparative example. Elements of the optical modulator according to the comparative example, except the N-type contact layer which is formed of GaAs doped with Si, are the same as that of the optical modulator 200. FIG. 6A illustrates a change in transmittance of the optical modulator according to the comparative example when a thickness of the N-type contact layer is 10 nm, 50 nm, or 110 nm.

Referring to FIG. 6A, in the case where a voltage is not applied to the optical modulator according to the comparative example, the transmittance with respect to the NIR ($\lambda$=850 nm) of the optical modulator according to the comparative example decreases from about 80% to 66% which is as much as the thickness of the N-type contact layer increases. Also in a case where the thickness of the N-type contact layer is 30 nm, 70 nm, or 90 nm (not shown), the transmittance with respect to the NIR ($\lambda$=850 nm) of the optical modulator according to the comparative example decreases by as much as the thickness of the N-type contact layer increases.

Figure 6B:
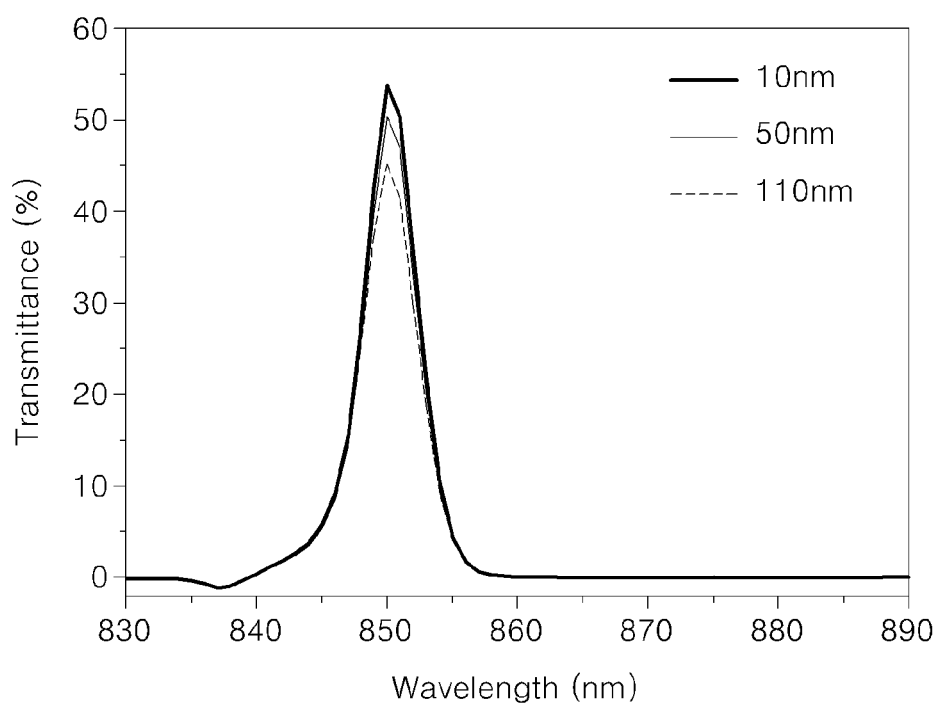
FIG. 6B illustrates a change in transmittance of incident rays depending on the thickness of the N-type contact layer, in a case where a voltage is applied to the optical modulator according to the comparative example.

FIG. 6B illustrates a change in transmittance of incident rays, of which a center wavelength $\lambda$ is 850 nm, depending on the thickness of the N-type contact layer, in a case where a voltage is applied to the optical modulator according to the comparative example.

Referring to FIG. 6B, in the case where a voltage is applied to the optical modulator according to the comparative example, the transmittance with respect to the NIR ($\lambda$=850 nm) of the optical modulator according to the comparative example decreases from about 54% to 44% which is as much as the thickness of the N-type contact layer increases. Thus, it may be understood that, as the optical modulator according to the comparative example includes the N-type contact layer formed of GaAs doped with a N-type dopant, the transmittance with respect to the NIR ($\lambda$=850 nm) of the optical modulator according to the comparative example decreases by as much as the thickness of the N-type contact layer increases. However, although the optical modulator 200 includes the first contact layer 110 whose optical thickness is relatively large, for example, in the range of about 2 μm to about 3 μm, the transmittance of the optical modulator 200 may be uniformly maintained.

FIGS. 7A through 7E are cross-sectional views illustrating processes of fabricating the optical modulator 200, according to an exemplary embodiment.

Figure 7A:
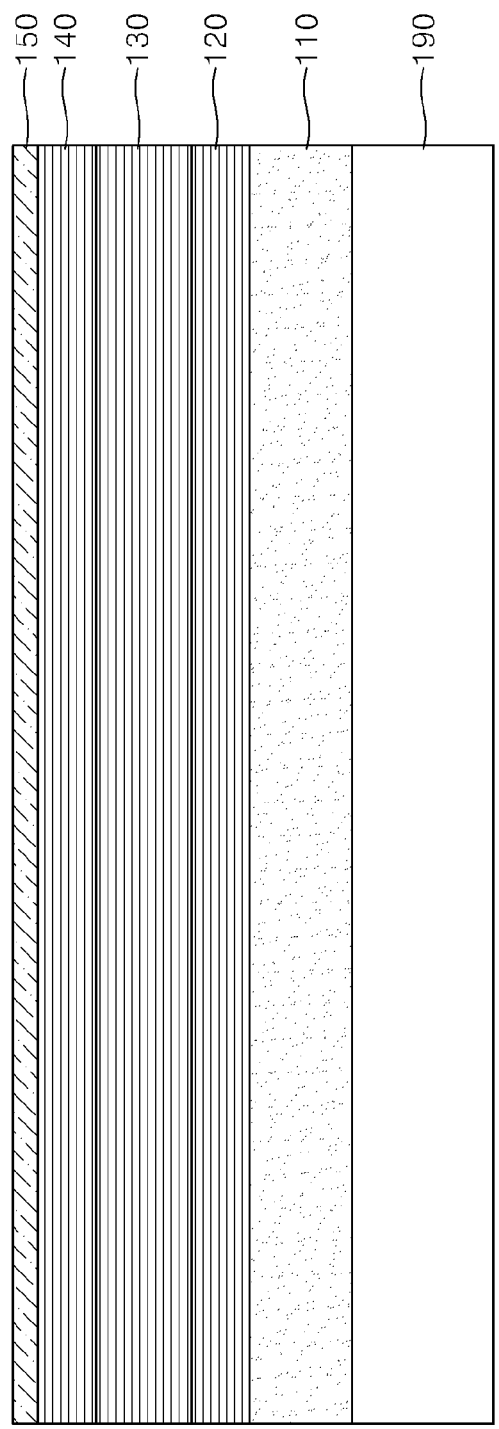

First, referring to FIG. 7A, a first contact layer 110, a lower reflection layer 120, an active layer 130, an upper reflection layer 140, and a second contact layer 150 may be sequentially stacked on a GaAs substrate 190. Details of structures, materials, and thicknesses of the GaAs substrate 190, first contact layer 110, lower reflection layer 120, active layer 130, upper reflection layer 140, and second contact layer 150, for example, may be as given in FIG. 1B. However, FIG. 1B is just exemplarily and this exemplary embodiment is not limited thereto, and thus, may be changed depending on a selection of a center absorption wavelength and an absorption bandwidth. The first contact layer 110, the lower reflection layer 120, the active layer 130, the upper reflection layer 140, and the second contact layer 150, for example, may be formed according to various kinds of epitaxial growth methods. The first contact layer 110, for example, may be an N-type contact layer doped with an N-type dopant, and the second contact layer 150 may be a P-type contact layer doped with a P-type dopant. In addition, the lower reflection layer 120 may be doped with an N-type dopant, and the upper reflection layer 140 may be doped with a P-type dopant.

Figure 7B:
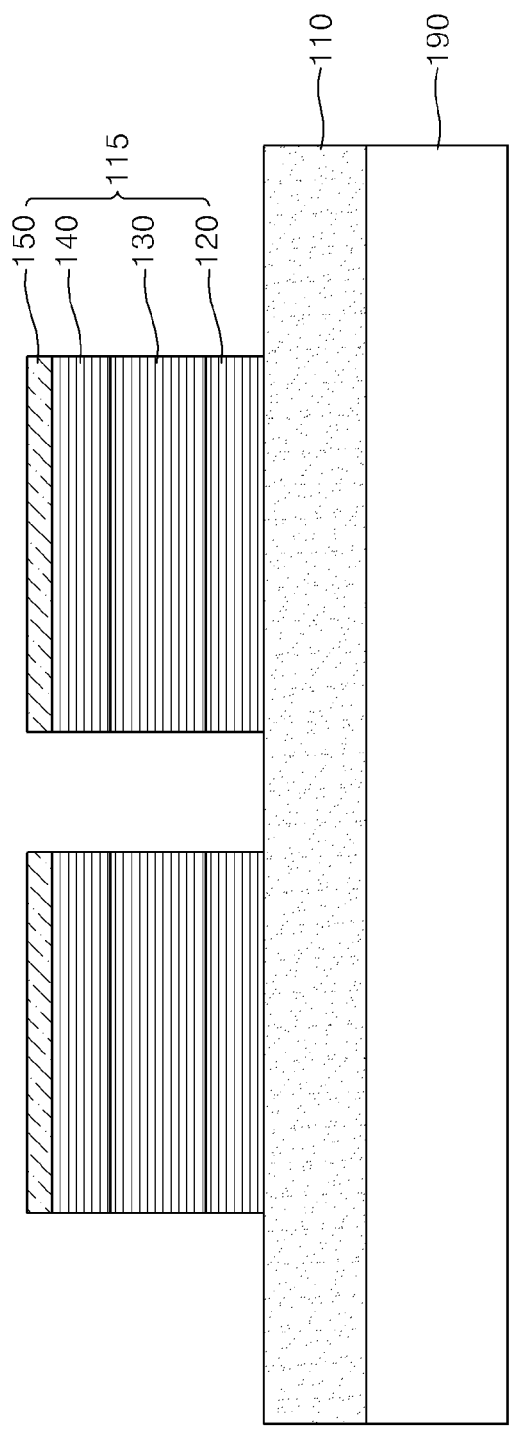

Next, referring to FIG. 7B, left and right side portions and center portions of the second contact layer 150, upper reflection layer 140, active layer 130, and lower reflection layer 120 may be etched until a surface of the first contact layer 110 is exposed, by using a mesa etching method. Accordingly, a plurality of stacked structures 115, each of which includes the second contact layer 150, the upper reflection layer 140, the active layer 130, and the lower reflection layer 120, may remain on the first contact layer 110, and be apart from each other. The plurality of stacked structures 115 may be arranged in a two dimensional array form.

Figure 7C:
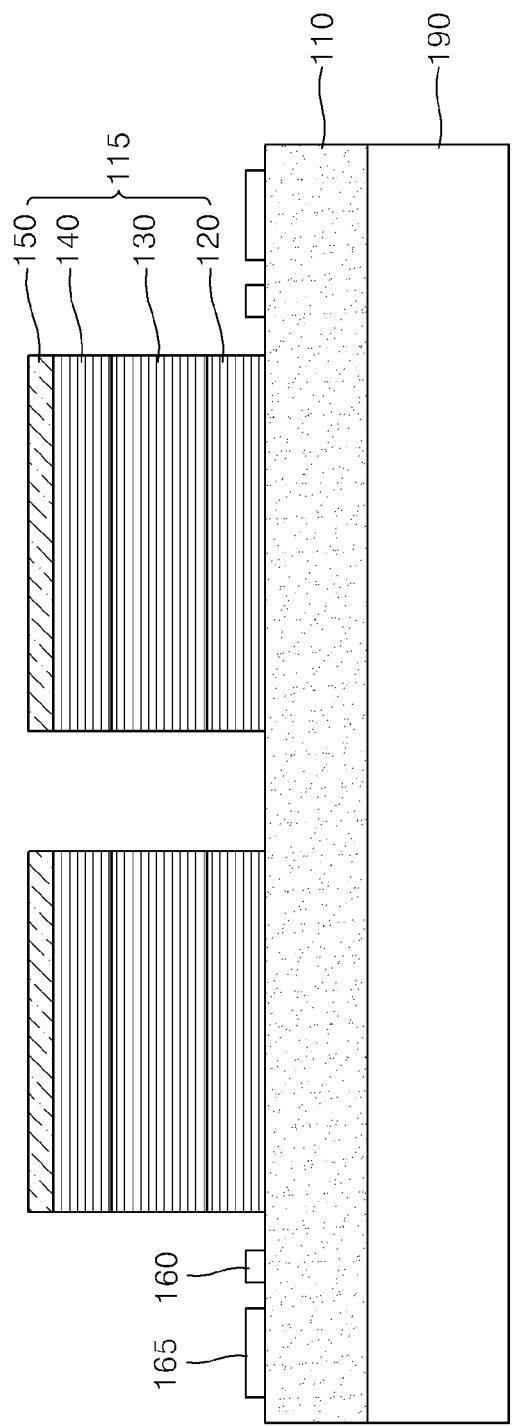

Referring to FIG. 7C, a plurality of first electrodes 160 and a plurality of first electrode pads 165 may be formed on the first contact layer 110. The plurality of first electrodes 160 and the plurality of first electrode pads 165 may be formed around arrays of the plurality of stacked structures 115, and may be electrically connected to each other. The plurality of first electrodes 160 and the plurality of first electrode pads 165, for example, may be formed by using a metal lift-off process.

Figure 7D:
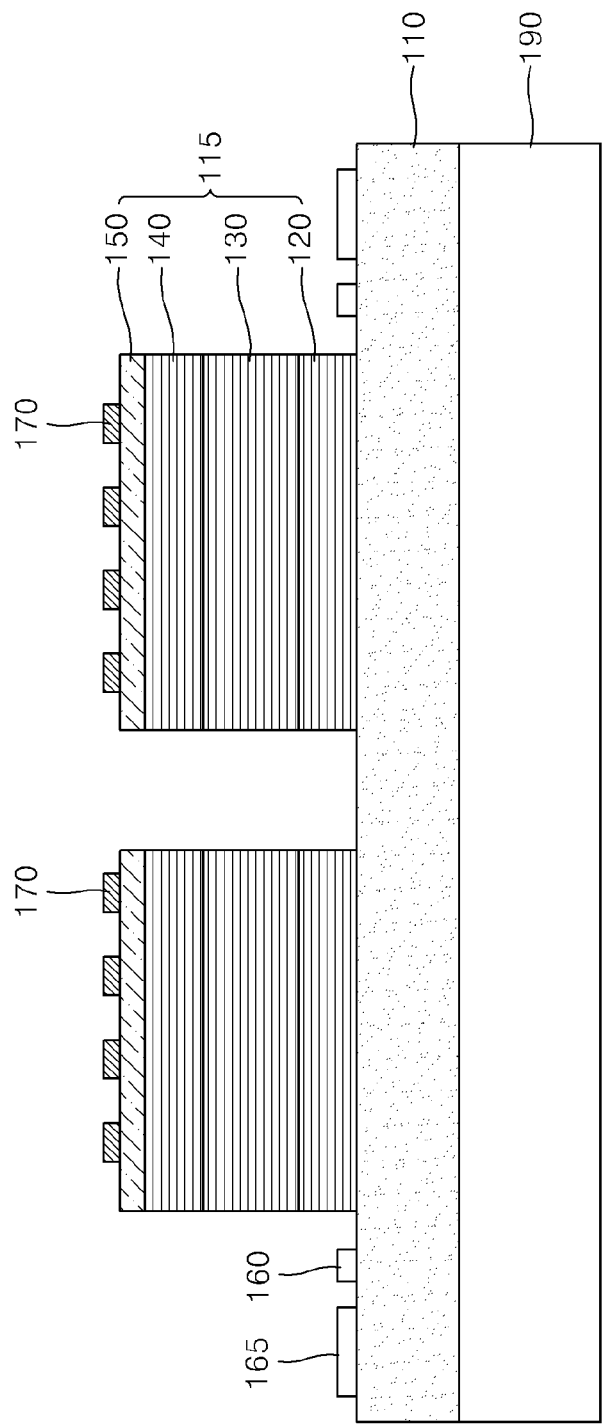

Next, referring to FIG. 7D, a second electrode 170 and a second electrode pad (not shown) may be formed on the second contact layer 150. The second electrode 170 and the second electrode pad may be electrically connected to each other. The second electrode 170 may be formed in a lattice form to reduce resistance thereof. For example, the second electrode 170 may be formed in a lattice form of a fish bone shape, a matrix, or a mesh. In this case, since a total area of the second electrode 170 is reduced, surface resistance may decrease.

Finally, referring to FIG. 7E, an insulation layer 180 may be formed on the first contact layer 110 and the plurality of stacked structures 115. That is, the insulation layer 180 may be disposed to cover the first contact layer 110, the lower reflection layer 120, the active layer 130, the upper reflection layer 140, and the second contact layer 150, and thus, may electrically isolate the plurality of stacked structures 115 from each other. In addition, the insulation layer 180 may be formed so as to cover the first electrode 160, but the first electrode pad 165 may be exposed by patterning. Similarly, the insulation layer 180 may be formed so as to cover the second electrode 170, but the second electrode pad (not shown) may be exposed by patterning. The insulation layer 180 may be formed of a dielectric and, for example, may be formed of a material such as benzocyclobutene (BCB). The insulation layer 180 may be formed so as to fill a space between two adjacent stacked structures 115.

In addition, a penetration hole 195 may be formed in the substrate 190. For example, the penetration hole 195 may be formed by forming a patterned mask layer(not shown) under the lower side of the substrate 190 and back-side etching the substrate 190. The penetration hole 195 may be formed in the substrate, using the first contact layer 110 as an etching stop layer. At this time, a first contact layer 110 having a large thickness may be used as an etching stop layer, and the mask layer 191 may be removed after forming the penetration hole 195. The penetration hole 195 may be formed below the plurality of stacked structures 115 disposed on the substrate 190. Thus, the method of fabricating the optical modulator may remove a portion of the GaAs substrate 190 whose transmittance with respect to the infrared rays is low, without damaging the other layers. A cross-section of the penetration hole 195 may be formed to have a polygonal shape such as a quadrangle or a round shape.

While an optical modulator unit, an optical modulator including the optical modulator unit, and a method of fabricating the optical modulator, according to exemplary embodiments have been particularly shown and described, it will be understood by those of ordinary skill in the art that various changes in form and details may be made therein without departing from the spirit and scope of the inventive concept as defined by the following claims.

What is claimed is:

1. An optical modulator unit comprising:
a first contact layer which transmits infrared rays;
a lower reflection layer which is disposed on the first contact layer;
an active layer which is disposed on the lower reflection layer and comprises a multiple quantum well; and
an upper reflection layer which is disposed on the active layer.

2. The optical modulator unit of claim 1, wherein the first contact layer transmits near infrared rays whose wavelength is in a range of 750 nm to 3000 nm.

3. The optical modulator unit of claim 1, wherein an optical thickness of the first contact layer is an integer multiple of $\lambda$, where $\lambda$ is a center wavelength of incident rays to be modulated.

4. The optical modulator unit of claim 3, wherein the lower reflection layer and the upper reflection layer each comprise a structure in which a first refraction layer and a second refraction layer, are repeatedly and alternately stacked, wherein each first refraction layer and each second refraction layer has an optical thickness of $\lambda/4$, and a refractive index of the second refraction layer is different than a refractive index of the first refraction layer.

5. The optical modulator unit of claim 4, wherein the first refraction layer comprises $Al_xGa_{1-x}As$ and the second refraction layer comprises $Al_yGa_{1-y}As$, wherein $0<x<1$, $0<y<1$, $x<y$.

6. The optical modulator unit of claim 1, wherein the first contact layer comprises $InGa_xAl_{1-x}P$, wherein $0 \le x \le 1$.

7. The optical modulator unit of claim 6, wherein the first contact layer is doped with a dopant.

8. The optical modulator unit of claim 1, further comprising a second contact layer which is disposed on the upper reflection layer.

9. An optical modulator comprising a plurality of optical modulator units of claim 1,
wherein the plurality of optical modulator units are arranged in a two dimensional array form and share the first contact layer.

10. The optical modulator of claim 9, further comprising:
a first electrode which is disposed on the first contact layer; and
a second electrode which is disposed on each of the plurality of optical modulator units.

11. The optical modulator of claim 10, wherein the second electrode has a lattice shape.

12. The optical modulator of claim 10, wherein the second electrode is shaped as a fish bone shape or a mesh shape.

13. The optical modulator of claim 9, further comprising an insulation layer which is disposed on the first contact layer and the plurality of optical modulator units.

14. The optical modulator of claim 9, further comprising a substrate which is disposed under the first contact layer, wherein a penetration hole is formed through the substrate.

15. The optical modulator of claim 14, wherein the penetration hole is formed in a region of the substrate corresponding to the plurality of optical modulator units.

16. A method of fabricating an optical modulator, the method comprising:
sequentially stacking a first contact layer, a lower reflection layer, an active layer, an upper reflection layer, and a second contact layer on an upper surface of a substrate;
etching the second contact layer, the upper reflection layer, the active layer, and the lower reflection layer until a surface of the first contact layer is exposed; and
forming a first electrode on the first contact layer, and forming a second electrode on the second contact layer.

17. The method of claim 16, further comprising forming a penetration hole by etching the substrate from a lower surface of the substrate, by using the first contact layer as an etching stop layer.

18. The method of claim 16, wherein, an optical thickness of the first contact layer is an integer multiple of $\lambda$, where $\lambda$ is a center wavelength of incident rays to be modulated.

19. The method of claim 16, wherein the first contact layer comprises $InGa_xAl_{1-x}P$, wherein $0 \leq x \leq 1$.

20. The method of claim 19, wherein the first contact layer is doped with a dopant.

21. The method of claim 16, further comprising forming an insulation layer covering the first contact layer, the lower reflection layer, the active layer, the upper reflection layer, and the second contact layer.

22. An optical modulator unit comprising:
a substrate;
a first contact layer disposed on an upper surface of the substrate, wherein the first contact layer transmits infrared rays;
a lower reflection layer disposed on the first contact layer;
an active layer disposed on the lower reflection layer, wherein the active layer comprises a multiple quantum well; and
an upper reflection layer disposed on the active layer;
wherein a penetration hole is formed through the substrate such that a lower surface of the first contact layer is exposed through the penetration hole.

23. The optical modulator unit of claim 22, further comprising:
a first electrode disposed on the first contact layer; and
a second electrode disposed on the upper reflection layer.

* * * * *